United States Patent [19]

Hindin et al.

[11] 4,134,860
[45] Jan. 16, 1979

[54] CATALYST MANUFACTURE

[75] Inventors: Saul G. Hindin, Mendham; Joseph C. Dettling, Jackson, both of N.J.

[73] Assignee: Engelhard Minerals & Chemicals Corporation, Iselin, N.J.

[21] Appl. No.: 792,174

[22] Filed: Apr. 29, 1977

[51] Int. Cl.$^2$ .................. B01J 21/04; B01J 23/40; B01J 23/74

[52] U.S. Cl. .................. 252/466 PT; 252/466 B; 252/472

[58] Field of Search ............. 252/466 B, 466 PT, 472; 423/213.2, 213.5

[56] References Cited

U.S. PATENT DOCUMENTS

| | | | |
|---|---|---|---|
| 3,331,787 | 7/1967 | Keith et al. | 252/466 PT |
| 3,898,183 | 8/1975 | Sugier et al. | 252/466 B |
| 4,006,103 | 2/1977 | Meguerian et al. | 252/466 B |

*Primary Examiner*—W. J. Shine

*Attorney, Agent, or Firm*—R. Jonathan Peters; Victor E. Libert

[57] ABSTRACT

Catalysts are made which have a catalytically-active composite containing a catalytically-promoting metal component and a high surface area, refractory oxide support, deposited on a macrosize carrier. The catalytically-active composite is made by combining a solution of a water-soluble, catalytically-promoting metal component with a finely divided, high area, refractory oxide which is sufficiently dry to absorb essentially all of said solution. The catalytically-promoting metal component of the resulting composite is converted to water-insoluble form while the composite is essentially devoid of unabsorbed solution. The composite is comminuted in the presence of an aqueous medium which is preferably acidic. The resulting slurry is used to deposit the catalytically-promoting metal-containing solids on the macrosize carrier, and the resulting material is dried and may be calcined.

35 Claims, No Drawings

CATALYST MANUFACTURE

The present invention relates to the manufacture of catalytic structures which have a catalytically-active composite containing a catalytically-promoting metal component and a high surface area, refractory oxide support which composite is deposited on a macrosize carrier. The catalytically-promoting metal component preferably contains one or more platinum group metals, and the macrosize carrier is preferably of low total surface area. The catalytically-active composite exhibits strong adherence to the carrier and the catalysts have superior activity. These characteristics are the result of making the catalysts by the process of the present invention. The catalysts promote chemical reactions and are particularly useful in promoting oxidation and reduction reactions, especially under strenuous conditions employed in converting the polluting constituents of waste gases to less noxious materials.

When preparing macrosize carrier-supported catalysts, it is known to deposit a high surface area, refractory oxide support on the carrier, and then impregnate the support with a platinum group metal component. This type of procedure is described in U.S. Pat. No. 3,565,830. This patent, as well as U.S. Pat. No. 3,331,787, describes another method of making the catalysts which involves combining the platinum group metal component in water-soluble form with the high surface area, refractory oxide support, and depositing the composite on the macrosize carrier by immersing the latter in an aqueous slurry of the platinum group metal-high area support composite. It is disclosed in these patents that the platinum group metal component may be converted into water-insoluble form, i.e., fixed, on the high area, refractory oxide support by subjecting the platinum group metal-high area composite to, for example, an atmosphere of hydrogen sulfide before the composite is placed on the carrier. Thus, Example II of U.S. Pat. No. 3,331,787, describes the addition of hydrogen sulfide to an aqueous slurry containing alumina and chloroplatinic acid in the preparation of macrosize carrier-supported catalysts. These patents also disclose that the high surface area support may be milled prior to its deposition on the macrosize carrier and in some instances this was done in the presence of an acid, see Examples I and XII of U.S. Pat. No. 3,565,830. In the preparation of Example II of U.S. Pat. No. 3,331,787 (Example XIII of U.S. Pat. No. 3,565,830) in which the platinum group metal was fixed on the support before being added to the carrier, the milling of the support containing the fixed platinum group metal was done without acid addition.

In manufacturing materials which are composites of a catalytically-promoting metal component, e.g. containing a platinum group metal, and high surface area, refractory oxide catalyst composite supported on a macrosized carrier, it is important that the product be characterized by good adherence of the catalytic composite to the carrier. Although considerable advantage in this respect is provided when the macrosize carrier material is porous to water, as distinguished from essentially nonporous materials such as metal or porcelain surfaces, improvement in the adherence of the cataltyically-active composite to both types of carriers is important. The problem of obtaining good adherence of the catalytic composite to the carrier is significant in the usual situation since a primary purpose of placing the composite on the carrier is to provide a structure having satisfactorily stable catalytic activity and physical stability throughout long periods of use under severe conditions of temperature and mechanical stress as will be encountered, for instance, when using the catalytic structure to treat the air polluting constituents in automotive vehicle exhaust gases. The catalysts made by the process of the present invention exhibit such characteristics to a marked extent.

In accordance with the present invention, catalysts are manufactured by contacting a finely-divided, high surface area, refractory oxide support with a solution of a water-soluble, catalytically-promoting metal component, preferably containing one or more platinum group metals, and providing a composite which is essentially devoid of free or unabsorbed liquid. The catalytically-promoting metal component of the solid, finely-divided composite is converted into an essentially water-insoluble form while the composite remains essentially free of unabsorbed liquid. This process can be accomplished by employing a refractory oxide support, e.g. alumina, including stabilized aluminas, which is sufficiently dry to absorb essentially all of the solution containing the catalytically-promoting metal component, i.e., the amounts of the solution and the support, as well as the moisture content of the latter, are such that their mixture has an essential absence of free or unabsorbed solution when the addition of the catalytically-promoting metal component is complete and during the conversion of the latter to water-insoluble form. Thus during the latter conversion or fixing of the catalytically-promoting metal component on the support, the composite remains essentially dry, i.e. it has substantially no separate or free liquid phase.

The composite containing the fixed, catalytically-promoting metal component is comminuted as a slurry which is preferably acidic, to provide solid particles that are advantageously primarily of a size of up to about 10 or 15 microns. The resulting slurry is used to coat a macrosize carrier, preferably having a low surface area, and the composite is dried and may be calcined. In these catalysts the composite of the catalytically-promoting metal component and high area support exhibits strong adherence to the carrier, even when the latter is essentially non-porous as may be the case with, for example, metallic carriers, and the catalysts have very good catalytic activity and life when employed under strenuous reaction conditions.

Although we do not wish to be bound by theory, the superior activity performance of catalysts made by this invention may result from essentially all of the catalytically-promoting metal component which is added by the method of this invention, being intimately associated with refractory oxide support particles at the time the catalytically-promoting metal component is converted to water-insoluble form. This fixing treatment may provide for good dispersion of the catalytically-promoting metal component on the support, and prevent a reduction in catalytic activity by the formation of separate particles of the catalytically-promoting metal which may be more readily subject to loss from the catalyst or sintering during its use. When catalytically-promoting metal component is not fixed on the support it may migrate in the composite and be non-uniformly distributed in the support and the resulting materials may exhibit undesirable variations in catalytic activity over the surface of the catalyst.

The method of this invention further provides compositions of uniform and certain catalytically-promoting metal content since essentially all of the metal component thereby added to the preparative system remains in the catalyst, and the compositions contain essentially the calculated amount of the single or plural active catalytically-promoting metal components. In some instances a plurality of catalytically-active metal components may be deposited simultaneously or sequentially on a given refractory oxide support. The intimate mixing of separately prepared catalytically-promoting metal component-refractory oxide composites of different composition made by the procedure of this invention, enables the manufacture of a variety of catalysts whose metal content may be closely controlled and selected for particular catalytic effects. Such mixed composites may, if desired, contain one or more catalytically-promoting metal components on a portion of the refractory oxide support particles, and one or more different catalytically-promoting metal components on another portion of the refractory oxide support particles. For example, the composite may have a platinum group metal component on a portion of the refractory oxide particles, and a base metal component on a different portion of the refractory oxide particles. Alternatively, different platinum group metals or different base metals may be deposited on separate portions of the refractory oxide support particles in a given composite. It is, therefore, apparent that the process of this invention is highly advantageous in that it provides catalysts which can be readily varied and closely controlled in composition.

Other advantages of the method of this invention are that precious metal group or base metal group components, alone or in mixtures, may be formed in separate layers on a high surface area refractory oxide which can be subsequently deposited on a macrosize carrier. This provides the maximum availability of metal components which are present in small quantities by depositing them on the outer surface of the carrier. Another version of the method of this invention is to deposit select metal components at the reactant inlet portion of a honeycomb or other structure, and deposit different metal components along the body or on the other end portion of the carrier. The latter method permits deposition of substantially discrete layers of various metal components on high surface area refractory oxides in order to obtain maximum use of expensive catalytic components or to achieve certain catalytic advantages, such as, an inlet portion being coated with components to give light-off or reaction-starting activity at relatively low temperatures. If the metal components are not selectively deposited on the carrier and fixed to the refractory oxide, they may move freely from one layer of the catalyst to the next.

In accordance with this invention the composite of the catalytically-promoting metal component and refractory oxide support can be prepared by mixing an aqueous solution containing a water-soluble form of the catalytically-promoting metal with a finely-divided, high surface area support to essentially completely absorb the solution in the support. The solution may contain one or more water-soluble compounds of a precious metal or a base metal. Use of platinum group metals is often preferred, and the water-soluble platinum group metal compounds employed may be, e.g., a basic compound such as a platinum hydroxide or tetramine complex, or an acidic compound such as chloroplatinic acid or rhodium nitrate. The useful base metal compounds include the water-soluble salts such as the nitrates, formates, other oxygen-containing compounds and the like. Highly suitable composites can be made by combining a support with both a basic platinum compound and an acidic compound of another platinum group metal such as rhodium or palladium. The separate compounds of the catalytically-promoting metals may be added to the support in one or more aqueous solutions to provide two or more metals on given support particles.

After the catalytically-promoting metal solution and high area refractory oxide support are combined the catalytically-promoting metal component is fixed on the support, i.e., converted to essentially water-insoluble form, while the composite remains essentially devoid of free or unabsorbed aqueous medium. The conversion may be effected by treatment with a gas such as hydrogen sulfide or hydrogen or with a liquid such as acetic acid or other agents which may be in liquid form, especially an aqueous solution, e.g. hydrazine. The amount of liquid used, however, is not sufficient for the composite to contain any significant or substantial amount of free or unabsorbed liquid during the fixing of the catalytically-promoting metal on the support. The fixing treatment may be with a reactive gas or one which is essentially inert, for example, the fixing may be accomplished by calcining the composite in air or other gas which may be reactive with the catalytically-promoting metal component or essentially inert. The resulting insoluble or fixed catalytically-promoting metal component may be present as a sulfide, oxide, elemental metal or in other form. When a plurality of catalytically-promoting metal components are deposited on support, fixing may be employed after each metal component deposition or after deposition of a plurality of such metal components.

The catalytically-active promoting metal component of the catalysts made by this invention may comprise one or more metals which may be in elemental or combined form as in the case of alloys, salts, oxides and the like. The metals are generally the heavy or transition metals of Groups III to VIII having an atomic number of at least about 23. The metals include base metals such as the iron group metals, iron, nickel and cobalt; the metals of Groups VB and VIB, e.g., vanadium, chromium, molybdenum and tungsten; copper; zinc; manganese; rhenium; and combinations of such metals. Often the base metals have atomic numbers from about 24 to 30. The precious metals may also be in the catalysts as catalytically-active components, and it is quite preferred that one or more metals from the platinum group be present. The amount of promoting metal is generally a minor portion of the catalytic composite, and the amount is sufficient to provide a desired catalytically-promoting effect during the use of the catalyst. Such amounts may depend on the choice of metal and the intended use of the catalyst, and the amounts are generally at least about 0.01 weight% of the catalyst. These amounts may be up to about 30 to 40% or more, and preferably, the amounts are about 0.1 to 20%. In the case of the base or non-precious metals the amounts are frequently at least about 1% of the catalyst. The catalytic activity of the promoting metal component is generally significantly greater than any such activity displayed by the refractory oxide support or the macrosize carriers of the catalysts.

In the preferred catalysts made by this invention, platinum group metal is present in the catalytically-active, promoting component in an amount sufficient to provide compositions having significantly enhanced catalytic activity due to the platinum group metal component. The useful platinum group metals added as a solution to the refractory oxide support include, for instance, platinum, ruthenium, palladium, iridium and rhodium, and mixtures or alloys of such metals, e.g. platinum-palladium, platinum-rhodium, platinum-palladium-rhodium. When a plurality of platinum group metals are employed they may be separately or simultaneously deposited on the support. The amount of platinum group metal is a minor portion of the catalysts and generally, from an economic standpoint, does not exceed about 5 weight percent of the composited catalyst. For instance, the amount may be about 0.01 to 4%, and is preferably about 0.03 to 1%. When the platinum group metal component of the catalysts contains more than one of such metals, this component may, for instance, be composed of a major amount of platinum and a minor amount of one or more of the other platinum group metals, e.g., one or both of palladium or rhodium. For example, this component of the catalyst may have about 55 to 98 weight percent platinum and about 2 to 45 weight percent of other platinum group metal based on the total of these metals. Unless stated otherwise the amounts of base and precious metals are given herein on the basis of the metal present regardless of its form.

Preferred platinum group metal-containing catalysts made by this invention may contain one or more platinum group metal components and one or more base metal components. Such catalysts may be particularly useful in systems in which it is desired to conduct both oxidation and reduction simultaneously, for instnce, to reduce nitrogen oxides while oxidizing carbon monoxide and hydrocarbons which may be present in the reaction system. The base metal component may be selected from those described above, and may particularly contain an iron group metal such as nickel, for instance, in oxide form. The amount of platinum group metal present may be as indicated above, while the base metal is often present in the catalyst in an amount greater than the platinum group metal, say at least about 0.5 weight % and up to about 20 weight % or more on an oxide basis. In such catalysts the weight ratio of base metal, oxide basis, to platinum group metal is generally at least about 2:1, preferably at least about 5:1, and preferably the catalysts contain more than one platinum group metal, particularly platinum plus one or more other platinum group metals, e.g., one or both of palladium and rhodium, in the amounts indicated above.

The order of addition of plural catalytically-promoting metal components to the finely-divided refractory oxide support may vary. For example, when making catalysts containing a base metal component and a platinum group metal component, the base metal component may be applied to the support first, followed by addition of the platinum group metal component, or these additions may be in the opposite order or cocurrently. Also, each of the catalytically-promoting metal components may be fixed on the support after its respective addition, or in some instances fixing may follow the deposition of both types of catalytically-promoting metal components on the support. In one procedure, the base metal component may be absorbed on the refractory oxide support as an aqueous salt solution, and this metal component fixed on the support by, for instance, calcination. An aqueous solution of the platinum group metal component can be absorbed on the base metal component-refractory oxide composite, and the platinum group metal component can then be fixed on the support. The resulting composite is comminuted as an aqueous slurry, and deposited on the macrosize carrier in making catalysts by this invention.

The high area, refractory oxide support with which the solution of the catalytically-promoting metal component is mixed contains one or more finely-divided refractory oxides as an essential component, e.g., silica or metal oxides such as alumina, chromia, zirconia, titania and the like; including mixed oxide forms such as silica-alumina, aluminosilicates which may be amorphous or crystalline, alumina-zirconia, alumina-chromia, alumina-ceria and the like. The refractory oxide may be dried or calcined at an elevated temperature to provide a high total surface area material, e.g., having a surface area of at least about 25, preferably at least about 75, square meters per gram as determined by the BET method. The preferred support is comprised substantially of alumina, which especially includes the stabilized aluminas, and advantageously the support has a major amount of alumina. These aluminas include the members of the gamma or activated alumina family, such as gamma and eta aluminas, as distinguished from relatively inactive, low surface area alpha-alumina. The alumina may be hydrated, for instance, alumina monohydrate. The alumina materials may contain minor amounts, e.g. about 1 to 20 weight percent, of other components such as $ZrO_2$, $TiO_2$, BaO, and rare earth oxides e.g., ceria, which may serve to improve the high temperature stability of the alumina. Most desirably, the amount of alumina in this component of the catalysts is at least about 75% of its total weight. The support materials used in this invention are often referred to as being in catalytically-active form, but such activity is generally of a lower order compared with that of the catalytically-active, promoting metal component.

The particle size of the finely-divided, high surface area, refractory oxide support is generally less than about 40 mesh, preferably less than about 200 mesh, when it is combined with the solution of the catalytically-promoting metal component. The sizes of most of the refractory oxide support particles are generally above about 10 or 15 microns. As noted above, when combined with the catalytically-promoting metal-containing solution the high area support is sufficiently dry to absorb essentially all of the solution. Thus the support may be dried and is preferably calcined to a catalytically-active form at elevated temperatures, say of at least about 250° C., before the support is combined with the catalytically-promoting metal component.

In making catalysts by this invention, the catalytically-active composite of the fixed or water-insoluble catalytically-promoting metal component and high area support is combined with a macrosize carrier, preferably of low total surface area. This can be accomplished by first comminuting the catalytically-active composite or plurality of such composites, as an aqueous slurry which is preferably acidic. This treatment is usually continued until the solid particles in the slurry have particle sizes which are mostly below about 10 or 15 microns. The comminution can be accomplished in a ball mill or other suitable equipment, and the solids content of the slurry may be, for instance, about 20 to 50 weight percent, preferably about 35 to 45 weight percent. The pH of the slurry is preferably below about 5 and acidity may be supplied by the use of a minor amount of a water-soluble organic or inorganic acid or other water-soluble acidic compounds such as salts. Thus the acid employed may be hydrochloric or nitric acid, or more preferably a lower fatty acid such as acetic acid, which may be substituted with, for example, chlorine as in the case of trichloroacetic acid. The use of fatty acids may serve to minimize any loss of platinum group metal from the support.

In order to deposit the catalytically-promoting group metal-support composite on the macrosized carrier, one or more comminuted slurries are combined separately or together with the carrier in any desired manner. Thus the carrier may be dipped one or more times in the slurry, with intermediate drying if desired, until the appropriate amount of slurry is on the carrier. The slurry employed in depositing the catalytically-promoting metal component-high area support composite on the carrier will often contain about 20 to 50 weight percent of finely-divided solids, preferably about 35 to 45 weight percent.

The comminuted catalytically-promoting metal component-high surface area support composite is deposited on the carrier in a desired amount, for example, the composite may comprise about 2 to 30 weight percent of the coated carrier, and is preferably about 5 to 20 weight percent. The composite deposited on the carrier is generally formed as a coating over most, if not all, of the surfaces of the carrier contacted. The combined structure may be dried and calcined, preferably at a temperature of at least about 250° C. but not so high as to unduly destroy the high area of the refractory oxide support, unless such is desired in a given situation.

The macrosize carrier of the catalyst is generally a major amount of the combined catalyst structure, for instance about 70 to 98 weight percent, preferably about 80 to 95 weight percent. The carrier preferably has a low total surface area of less than about 5, preferably less than 1, square meters per gram as determined by the BET method. These low surface area carriers generally have substantially less catalytic activity than the high surface area, refractory oxide support component of the catalysts, and the carrier may be essentially catalytically inert with respect to the reaction system in which the catalyst is employed. The carrier is macrosize, i.e., it has at least one dimension which is at least about 1 millimeter, preferably at least about 2 millimeters, and the carrier may be in pellet form, but the monolithic carriers are preferred. The monolithic carriers are of the type that have a plurality of passages through a single piece of the carrier. The passages are open to fluid flow and thus are not blocked or sealed against flow from an inlet to a separate outlet, and thus the passages are not merely surface pores. Actually, the passages are quite large compared with the size of surface pores, and the fluids going through the passages are not subject to excessive pressure drop. Preferably, the passages are essentially straight from their fluid inlet to their fluid outlet. Generally, the principal cross-sectional dimension of the passages is at least about 0.1 millimeter. The monolithic catalyst carriers have a unitary, skeletal structure of macrosize with a minimum cross-sectional dimension of at least about 2 centimeters, e.g., in honeycomb form.

The flow passages of the monolithic carrier are usually thin-walled channels providing a relatively large amount of superficial surface area. The channels can be one or more of a variety of cross-sectional shapes and sizes. Thus the channels can be of the cross-sectional shape of, for example, a trapezoid, rectangle, square, hexagon, sinusoid, oval, circle or other shape, so that cross-sections of the support may represent a repeating pattern that can be described as a honeycomb, corrugated or lattice structure. The walls of the cellular channels are generally of a thickness necessary to provide a strong unitary body, and the thickness will often fall in the range of about 0.5 to 25 mils. Metallic structures may often have a thickness of about 0.5 to 5 mils while ceramic structures generally have thicknesses of about 2 to 25 mils. In the case of the latter wall thicknesses, the structures may contain from about 100 to 2500 or more gas inlet openings for the flow channels per square inch of cross-sectional and a corresponding number of the gas flow channels, preferably about 150 to 500 gas inlets and flow channels per square inch. The open area of the cross-section may be in excess of about 60% of the total area. The size and dimensions of the carrier of the catalysts of this invention can be varied and the length of the flow channels is often at least about 0.5 inch.

The carrier may be ceramic in nature and the preferred ceramic carriers include cordierite, cordierite-alpha-alumina, silicon nitride, zircon mullite, spodumene, alumina-silica-magnesia or zirconium silicate. Examples of other refractory ceramic materials utilizable as support or carrier are sillimanite, magnesium silicates, zircon, petalite, alpha-alumina and aluminosilicates. Although the support may be a glass ceramic, it is preferably unglazed and may be essentially entirely crystalline in form. Further, the carrier structure may have considerable accessible porosity as distinguished from the substantially non-porous porcelain utilized for electrical applications, for instance in spark plugs, characterized by having relatively little accessible porosity. Thus the carrier structure may have a water pore volume of at least about 10 weight percent, i.e., the support will absorb this amount of water when immersed at ambient conditions and the free water removed. Such supports are described, for example, in U.S. Pat. No. 3,565,830, herein incorporated by reference.

The carrier of the catalysts made by this invention may be metallic in nature and be composed of one or more metals or metal alloys. The metallic carriers may be in various shapes such as pellets or in monolithic form. Preferred metallic supports include the heat-resistant, base-metal alloys, especially those in which iron is a substantial or major component. Such alloys may contain one or more of nickel, chromium, and aluminum, and the total of these metals may advantageously comprise at least about 15 weight percent of the alloy, for instance, about 10 to 25 weight percent of chromium, about 3 to 8 weight percent of aluminum and up to about 20 weight percent of nickel, say at least about 1 weight percent of nickel, if any or more than a trace amount be present. The preferred alloys may contain small or trace amounts of one or more other metals such as manganese, copper, vanadium, titanium and the like. The surfaces of the metal carriers may be oxidized at quite elevated temperatures, e.g. at least about 1000° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

The catalytic compositions made by the present invention can be employed to promote chemical reactions, such as reductions, methanations and especially the oxidation of carbonaceous materials, e.g., carbon monoxide, hydrocarbons, oxygen-containing organic compounds, and the like, to products having a higher weight percentage of oxygen per molecule such as intermediate oxidation products, carbon dioxide and water, the latter two materials being relatively innocuous materials from an air pollution standpoint. Advantageously, the catalytic compositions can be used to provide removal from gaseous exhaust effluents of uncombusted or partially combusted carbonaceous fuel components such as carbon monoxide, hydrocarbons, and intermediate oxidation products composed primarily of carbon, hydrogen and oxygen, or nitrogen oxides. Although some oxidation or reduction reactions may occur at relatively low temperatures, they are often conducted at elevated temperatures of, for instance, at least about 150° C., preferably about 200° to 900° C., and generally with the feedstock in the vapor phase. The materials which are subject to oxidation generally contain carbon, and may, therefore, be termed carbonaceous, whether they are organic or inorganic in nature. The catalysts are thus useful in promoting the oxidation of hydrocarbons, oxygen-containing organic components, and carbon monoxide, and the reduction of nitrogen oxides. These types of materials may be present in exhaust gases from the combustion of carbonaceous fuels, and the catalysts are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. Many such reaction systems are known in the art.

The catalysts made by this invention can be used to promote oxidation reactions where there is simultaneous reduction of a feed component as in the case, for example, of oxidizing carbon monoxide and hydrocarbon constituents of exhaust gases while reducing nitrogen oxides present. This type of operation may be facilitated by controlling the oxygen content of the mixture undergoing treatment at approximately the stoichiometric amount needed for complete oxidation.

The present invention will be illustrated further by the following examples. All parts and percentages are by weight unless otherwise indicated.

EXAMPLE 1

Five hundred and fifty (550) grams of a powdered composite of 98% alumina and 2% ceria by weight having a surface area after calcination of 117 $m^2/g$ is impregnated with 415 ml. of aqueous amine solution containing 8.164 g. of platinum as $H_2Pt(OH)_6$. This is followed by impregnation of the solids with an aqueous solution of glacial acetic acid (33 ml. of glacial acetic acid diluted with 50 ml. of $H_2O$) so that the combination of both solutions is insufficient to completely saturate the powder. The addition of the glacial acetic acid fixed the platinum component on the alumina support. The resulting powder is then ball-milled as a slurry with an additional 85 ml. of $H_2O$ in order to reduce the particle size so that 90% of the particles are less than 9 microns.

A cordierite honeycomb having about 236 passages per square inch of cross-section and a total surface area of less than 1 $m^2/g$ is then dipped into the diluted, ball-milled slurry to coat the passages of the honeycomb with the pre-impregnated slurry to a concentration of 1.46 $g/in^3$. Excess slurry is blown off the composite by compressed air, and the composite is dried at 120° C. to remove free water and calcined at 500° C. to yield a catalyst having the composition 0.014 g. $Pt/in^3$.

EXAMPLE 2

The following catalyst was prepared and shows that if excess Pt solution is used, the resulting catalyst has poorer high temperature stability than the catalyst in Example 1. The catalyst is prepared by ball-milling 2000 g. of a powdered composite of 98% alumina and 2% ceria by weight having a surface area after calcination of 114 $m^2/g$. with 50 ml. of glacial acetic acid and 2140 ml. of deionized water to form a slurry.

An aqueous solution containing 29.55 g. of platinum as $H_2Pt(OH)_6$ is added to the above slurry with good mixing. An additional 23 ml. of glacial acetic acid is added to the slurry. A cordierite honeycomb similar to that used in Example 1 is dipped into the platinum-containing slurry in order to coat it to a concentration of 1.68 $g/in^3$. Excess slurry is blown off the composite by compressed air, and the composite is dried at 120° C. to remove free water and calcined at 500° C. to yield a catalyst having the composition of 0.014 g. $Pt/in^3$.

When the activity of the catalyst of Example 2 was compared to that of the catalyst of Example 1, after each catalyst was aged for 24 hours at 1800° F. in 10% steam, the temperatures required to achieve 90% conversion by oxidation of CO and of $C_2H_4$ were lower for the catalyst of Example 1. Results are shown in Table I.

TABLE I

| Catalyst | Pt, $g/in^3$ | $Al_2O_3/CeO_2$, $g/in^3$ | Temp. for Removal of 90% CO | Temp. for Removal of 90% $C_2H_4$ |
| --- | --- | --- | --- | --- |
| Example 1 | 0.014 | 1.46 | 788° F | 797° F |
| Example 2 | 0.014 | 1.68 | 806° F | 833° F |

Test Conditions:
VHSV: 80,000 hr.$^{-1}$
Feed Gas Composition:
3% $O_2$ 300 ppm $C_2H_4$
1% CO 500 ppm NO
10% $H_2O$ 10% $CO_2$
Balance $N_2$

EXAMPLE 3

To 1000 g. of a powdered support of 90% alumina and 10% ceria by weight having a surface area after calcination of 112 $m^2/g$. is added an aqueous solution of 32.067 g. $H_2PtCl_6$ and 10.689 g. $PdCl_2$ so that there is insufficient liquid to saturate the surface. The powder is then placed in a vacuum chamber and evacuated. $H_2S$ is passed over the sample to fix the platinum group metals on the support. The sulfided powder is placed in a ball mill and diluted with 30 ml. of glacial acetic acid and 337 ml. of deionized water to form a slurry. After 16 hours of ball-milling, a cordierite honeycomb having about 264 passages per square inch of cross-section and a total surface area of less than 1 $m^2/gm$ is dipped into the diluted slurry in order to coat it with pre-impregnated slurry to a concentration of 1.44 $g/in^3$. The excess slurry is blown off the composite by compressed air, and the composite is dried at 120° C. to remove free water and calcined at 500° C. to yield a catalyst having the composition of 0.0174 g. Pt/in$^3$ and 0.0083 g. Pd/in$^3$.

EXAMPLE 4

The improvement in high temperature stability and durability of the catalyst of Example 3 was shown by comparison with a catalyst prepared by applying an alumina/ceria coating (wash coat) to the honeycomb before application of the precious metals. This catalyst is prepared by ball-milling 1000 g. of a powdered composite of 90% alumina and 10% ceria by weight having a surface area of 110 m$^2$/g in 75 ml. of HNO$_3$ and 965 ml. of H$_2$O. After 16.5 hours of milling, the resulting slurry is diluted and a cordierite honeycomb similar to that in Example 3 is dipped into the slurry to give a wash coat loading on the honeycomb of 1.42 g/in$^3$.

The washcoated honeycomb is then dipped for 10 minutes in an aqueous solution of H$_2$PtCl$_6$ and Na$_2$PdCl$_6$ containing 0.337% Pt and 0.142% Pd. The coated honeycomb is drained and excess solution is blown off with compressed air. The composite is placed in a vacuum chamber and evacuated. The coated honeycomb is filled with H$_2$S and held for 15 minutes. The composite is washed chloride free in flowing deionized water, dried at 120° C. to remove free water, and calcined at 500° C. to yield a catalyst having the composition of 0.0149 g. Pt/in$^3$ and 0.0080 g. Pd/in$^3$.

After being aged for 24 hours at 1800° F. in 10% steam, the catalyst of Example 4 is compared to the catalyst of Example 3 for CO and C$_2$H$_4$ oxidation activity. The results in Table II show that the catalyst of Example 3 is more active for ethylene oxidation.

TABLE II

| Catalyst | Pt, g/in$^3$ | Pd, g/in$^3$ | Wash-coat g/in$^3$ | Temp. for Removal of 90% CO | Temp for Removal of 90% C$_2$H$_4$ |
|---|---|---|---|---|---|
| Example 3 | 0.0174 | 0.0083 | 1.44 | 509° F | 563° F |
| Example 4 | 0.0149 | 0.0080 | 1.42 | 500° F | 644° F |

Test Conditions:
VHSV: 80,000 hr.$^{-1}$
Feed Gas Composition: 3% O$_2$, 1% CO, 10% H$_2$O, 300 ppm C$_2$H$_4$, 500 ppm NO, 10% CO$_2$, Balance N$_2$ After aging the above catalysts by contact with exhaust gases from a gasoline-burning engine of an automobile travelling for 10,382 miles, the catalysts were evaluated under the same conditions for CO and C$_2$H$_4$ oxidation activity. The results in Table III show that again the catalyst of Example 3 is more active for ethylene oxidation.

TABLE III

| Catalyst | Pt, g/in$^3$ | Pd, g/in$^3$ | Wash-coat g/in$^3$ | Temp. for Removal of 90% CO | Temp. for Removal of 90% C$_2$H$_4$ |
|---|---|---|---|---|---|
| Example 3 | 0.0174 | 0.0083 | 1.44 | 455° F | 877° F |
| Example 4 | 0.0149 | 0.0080 | 1.42 | 455° F | 977° F |

EXAMPLE 5

Three hundred grams of a powdered support of 90% alumina and 10% ceria by weight having a surface area after calcination of 110 m$^2$/g is impregnated with 240 ml. of an aqueous solution containing 169.7 g. Fe(NO$_3$)$_3$.9H$_2$O and 4.5 g. CrO$_3$ so that the solution is insufficient to completely wet the powder. The powder is dried overnight in 125° C. oven and calcined for 2 hours at 500° C. which fixed the metal components on the support.

Another 300 g. of the powdered support of 90% alumina and 10% ceria by weight is impregnated with 240 ml. of an aqueous solution containing 15.070 g. H$_2$PtCl$_6$ and 2.009 g. PdCl$_2$ so that the solution is insufficient to completely wet the powder. A solution containing 4 ml. of N$_2$H$_4$.H$_2$O and 6 ml. deionized water is added to the powder which remains incompletely saturated with water, and the platinum group metals were thereby fixed on the support. The moist powder containing Pt and Pd is put into a ball mill with 100 g. of the foregoing described powdered support containing Fe$_2$O$_3$, Cr$_2$O$_3$, CeO$_2$ and Al$_2$O$_3$, 30 ml. of glacial acetic acid and 150 ml. of deionized water.

After ball-milling the mixture for 17 hours, the resulting diluted slurry is used to coat a cordierite honeycomb having about 256 passages per square inch of cross-section and a total surface area of less than 1 m$^2$/gm, so as to give a concentration of 1.69 g/in$^3$. Excess slurry is blown off the composite by compressed air and the composite is dried at 125° C. to remove free water and calcined at 500° C. to yield an oxidation catalyst having a composition of 0.025 g Pt/in$^3$ and 0.0051 g Pd/in$^3$.

EXAMPLE 6

A 1000 g. of a powdered composite of 90% Al$_2$O$_3$ and 10% ceria similar to that in Example 5 is impregnated with 770 ml. of an aqueous solution of 21.146 g. H$_2$PtCl$_6$ and 2.819 g. PdCl$_2$. To this composite is added 6 ml. of N$_2$H$_4$.H$_2$O diluted to 30 ml. in deionized water. The resulting semi-wet powder is placed in a ball mill with 20 ml. of glacial acetic acid and 200 ml. of H$_2$O. The powder which contains insufficient solution to completely wet the powder is placed in a ball mill with 20 ml. of glacial acetic acid and 255 ml. of H$_2$O. After 19 hours of ball-milling, the diluted slurry is used to coat a stainless steel honeycomb having about 220 passages per square inch of cross-section to a concentration of 1.08 g/in$^3$. Excess slurry is blown off the composite by compressed air, and the composite is dried at 120° C. to remove free water and calcined at 500° C. to yield an oxidation catalyst having the composition 0.0091 g. Pt/in$^3$ and 0.0018 g. Pd/in$^3$.

EXAMPLE 7

Two thousand (2000) grams of powdered composite of 90% alumina and 10% ceria similar to that in Example 5 is impregnated with an ammoniacal solution containing 565.5 g. Ni(CHO$_2$)$_2$.2H$_2$O so that the solution does not completely wet the powder. The powder is dried overnight in an oven at 120° C. and calcined for two hours at 650° C. A 180 g. sample of this powder is placed in a ball mill with 25 ml. of glacial acetic acid and 250 ml. of H$_2$O. After ball-milling for 17 hours, a cordierite honeycomb having about 300 passages per square inch and a total surface area of less than 1 m$^2$/gm, is dipped in the diluted slurry so as to give a coating concentration of 0.47 g/in$^3$. Excess slurry is blown off, and the composite is dried and calcined at 500° C.

Another 450 g. of the composite powder of 90% alumina and 10% ceria is impregnated with an aqueous amine solution containing 14.100 g. of H$_2$Pt (OH)$_6$. This is followed with impregnation of the powder by an aqueous solution containing 0.437 g. Rh as Rh(NO$_3$)$_3$ and 20 ml. of glacial acetic acid, and the combination of solutions is such that the total volume is insufficient to completely saturate the powder. The resulting powder is then ball-milled with an additional 20 ml. of glacial acetic acid and 50 ml. of $H_2O$.

The cordierite honeycomb containing the 0.47 g/in$^3$ of the first nickel oxide coating is dipped into the diluted slurry containing rhodium, platinum, alumina and ceria so as to give an additional coating of 1.42 g/in$^3$ or a total coating concentration of 1.88 g/in$^3$. The excess slurry is blown off the composite and the composite is dried at 120° C. to remove free water and calcined at 500° C. to yield a polyfunctional catalyst having the composition of 0.0262 g. Pt/in$^3$ and 0.0014 g. Rh/in.$^3$.

EXAMPLE 8

1000 Grams of a powdered support of 90% $Al_2O_3$ and 10% $CeO_2$ similar to that in Example 5 is impregnated with 770 ml. of an aqueous solution containing 45.01 g. of $H_2PtCl_6$. To this composite is added 10 ml. of $N_2H_4.H_2O$ diluted to 30 ml. Another 1000 g. of the powdered support of 90% $Al_2O_3$ and 10% $CeO_2$ is impregnated with 770 ml. of an aqueous solution containing 15.00 g. $PdCl_2$. To this composite is added 4.5 ml. of $N_2H_4.H_2O$ diluted to 30 ml. In the impregnation of each support the total amount of solution is such that the powder is semi-wet. The impregnated powders are blended to give a homogeneous mixture. Half of the mixture is placed in a ball mill with 30 ml. of glacial acetic acid and 256 ml. of $H_2O$.

After 17 hours of milling, the slurry is diluted. Nichrome wire (0.015 inch in diameter) coils are dipped into this diluted slurry to coat the coils. Two coils were coated so that coatings of 4.86% and 8.32% based on the weight of the coils, were achieved. The resulting coatings after drying and calcination are continuous and without cracks. The catalytically coated coils are used for ignition of combustible gases after a current has been passed through them to raise the temperature sufficiently for such ignition.

EXAMPLE 9

One thousand nine hundred ninety-five (1995) Grams of a powdered composite of calcined, 95% alumina and 5% ceria high area support is impregnated with an ammoniacal solution containing 766 g. of $Ni(CHO_2)_2.2-H_2O$ so that the solution does not completely wet the powder. The powder is oven dried at 200° C. and calcined for two hours at 650° C. The calcined material is impregnated with an aqueous amine solution containing 23.085 g. of platinum added as $H_2Pt(OH)_6$. This is followed with impregnation of the powder by an aqueous solution containing 3.295 g. Rh as $Rh(NO_3)_3$ and 240 ml. of glacial acetic acid, and the combination of solutions is such that the total volume is insufficient to completely saturate the powder. The resulting powder is then ball-milled with an additional 900 ml. of $H_2O$. After ball-milling for 19 hours, a cordierite honeycomb having about 300 passages per square inch and a total surface area of less than 1 m$^2$/gm, is dipped in the diluted slurry so as to give a coating concentration of 2 g/in$^3$. Excess slurry is blown off, and the composite is dried and calcined at 500° C. to yield a polyfunctional catalyst having the composition of 0.0203 g. Pt/in$^3$, 0.0029 g. Rh/in$^3$ and 0.3 g. nickel oxide per cubic inch.

The catalyst of Example 9 is tested for oxidation and reduction activity using a synthetic automobile engine exhaust gas containing by volume 1.65% carbon monoxide, 13.5% carbon dioxide, 13.5% water, 0.9% oxygen, 0.55% hydrogen, 300 ppm hydrocarbons, 2000 ppm NO and the balance nitrogen. The synthetic exhaust gas is passed in contact with the catalyst at a air to fuel weight ratio of 14.5, 100,000 VHSV and 500° C. The conversions are 94% for carbon monoxide, 99% for NO and 100% conversion of hydrocarbon.

The foregoing described method of making catalysts according to this invention relate to the manner of providing one or more catalytically-promoting metal components and refractory oxide supports in a catalyst having a macrosize carrier. Other components such as catalytically-promoting metal components, refractory oxide supports, stabilizers and the like, may be added to the catalysts by other procedures in conjunction with the methods of the present invention, and the advisability of doing so may depend on various considerations, for instance, the cost of manufacture, or the nature, performance characteristics or other properties of the catalyst desired for use in a given situation.

It is claimed:

1. A method of manufacturing a composition having a water insoluble catalytically promoting component thereon, which method consists essentially of mixing a solution of a water-soluble, catalytically-promoting metal component and finely-divided, high surface area, refractory oxide which is sufficiently dry to absorb essentially all of said solution, converting said catalytically-promoting metal component in the resulting composite to water-insoluble form while said composite remains essentially devoid of free liquid, comminuting said water-insoluble, catalytically-promoting metal-refractory oxide material as a slurry, depositing the slurry on a solid, macrosize carrier, and drying the resulting composite.

2. The method of claim 1 in which said slurry is acidic.

3. The method of claim 1 in which the catalytically-promoting metal component is comprised of platinum group metal.

4. The method of claim 3 wherein said refractory oxide comprises an activated alumina having a surface area of at least about 75 square meters per gram.

5. The method of claim 4 wherein said comminuting provides a slurry in which most of the solids have particle sizes of less than about 10 microns.

6. The method of claim 5 wherein said platinum group metal component is comprised of platinum.

7. The method of claim 6 wherein said slurry contains acetic acid.

8. The method of claim 1 wherein said carrier comprises a monolithic ceramic or metallic structure having a plurality of flow channels therethrough.

9. The method of claim 8 wherein the water-insoluble catalytically-promoting metal component is comprised of platinum group metal and base metal oxide.

10. The method of claim 9 wherein the platinum group metal is comprised of platinum.

11. The method of claim 10 wherein the base metal oxide is comprised of nickel oxide.

12. A method of manufacturing a composition having a water insoluble catalytically promoting component thereon, which method consists essentially of mixing an aqueous solution of a water-soluble, platinum group metal component and finely-divided, high surface area, calcined alumina which is sufficiently dry to absorb essentially all of said solution, converting said platinum group metal component of resulting composite to water-insoluble form while said composite remains essentially devoid of free liquid, comminuting said water-insoluble, platinum group metal-alumina composite in an aqueous, acidic slurry to provide a slurry in which most of the solids have a particle size of less than about 10 microns, depositing the slurry on a solid, macrosize carrier having a total surface area of less than about 1 square meter per gram, and drying the resulting composite.

13. The method of claim 12 wherein said carrier is a monolithic ceramic or metallic structure having a plurality of flow channels therethrough.

14. The method of claim 13 wherein said platinum group metal component is comprised of platinum.

15. The method of claim 14 wherein said slurry contains a base metal oxide component.

16. The method of claim 15 wherein said base metal oxide component is comprised of nickel oxide.

17. The method of claim 13 wherein said water-soluble platinum group metal component comprises an acidic rhodium compound and a basic platinum compound.

18. The method of claim 13 wherein said slurry contains acetic acid during said comminution.

19. A method of manufacturing a composition having a water-insoluble catalytically-promoting component thereon, which method consists essentially of the steps of (a) mixing an aqueous solution of a water-soluble, catalytically-promoting metal component and finely-divided, high surface area, refractory oxide which is sufficiently dry to absorb essentially all of said solution, (b) converting said catalytically-promoting metal component in the resulting composite to water-insoluble form while said composite remains essentially devoid of free liquid, (c) repeating steps (a) and (b) while using a different catalytically-promoting metal and a separate portion of a finely-divided, high surface area, refractory oxide than used in steps (a) and (b), comminuting the products of steps (b) and (c) either separately or together, in an aqueous slurry, depositing the comminuted products on a solid, macrosize carrier, and drying the resulting composite.

20. The method of claim 19 wherein said slurry is acidic and the macrosize carrier has a total surface area of less than about 5 square meters per gram.

21. The method of claim 20 wherein said refractory oxide is comprised of alumina.

22. The method of claim 21 in which one of said catalytically-promoting metal components is comprised of base metal component and another is comprised of platinum group metal component.

23. The method of claim 22 in which said base metal component is comprised of nickel oxide.

24. A method of claim 1 in which said resulting composite is calcined.

25. A method of claim 6 in which said resulting composite is calcined.

26. A method of claim 11 in which said resulting composite is calcined.

27. A method of claim 15 in which said resulting composite is calcined.

28. A method of claim 17 in which said resulting composite is calcined.

29. A method of claim 24 in which said resulting composite is calcined at a temperature of at least about 250° C.

30. A method of claim 25 in which said resulting composite is calcined at a temperature of at least about 250° C.

31. A method of claim 26 in which said resulting composite is calcined at a temperature of at least about 250° C.

32. A method of claim 27 in which said resulting composite is calcined at a temperature of at least about 250° C.

33. A method of claim 28 in which said resulting composite is calcined at a temperature of at least about 250° C.

34. A method of claim 19 in which said resulting composite is calcined.

35. A method of claim 34 in which said resulting composite is calcined at a temperature of at least 250° C.

* * * * *